United States Patent
Li et al.

(10) Patent No.: US 12,332,515 B2
(45) Date of Patent: Jun. 17, 2025

(54) LIGHT MODULATION MODULE HAVING TEMPERATURE ADJUSTMENT MODULE AND REFLECTIVE PROJECTION DEVICE HAVING THE SAME

(71) Applicant: Coretronic Corporation, Hsin-Chu (TW)

(72) Inventors: Heng Li, Hsin-Chu (TW); Kuang-Hsiang Chang, Hsin-Chu (TW); Pei-Cheng Liao, Hsin-Chu (TW); Jen-Yu Shie, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 228 days.

(21) Appl. No.: 17/482,419

(22) Filed: Sep. 23, 2021

(65) Prior Publication Data
US 2022/0100024 A1     Mar. 31, 2022

(30) Foreign Application Priority Data
Sep. 30, 2020   (CN) .......................... 202011055505.X

(51) Int. Cl.
G02F 1/1333    (2006.01)
G03B 21/00     (2006.01)
G03B 21/16     (2006.01)

(52) U.S. Cl.
CPC ..... *G02F 1/133382* (2013.01); *G03B 21/006* (2013.01); *G03B 21/16* (2013.01)

(58) Field of Classification Search
CPC .................... G02F 1/133382; G02F 1/136277
See application file for complete search history.

(56) References Cited

U.S. PATENT DOCUMENTS 6,072,459 A * 6/2000 Asakawa .......... G02F 1/133382
                                              349/161
9,182,622 B2   11/2015 Lin et al.
(Continued)

FOREIGN PATENT DOCUMENTS

CN          2569184        8/2003
CN        101308318       11/2008
(Continued)

OTHER PUBLICATIONS

"Office Action of China Counterpart Application", issued on Oct. 31, 2023, p. 1-p. 10.
(Continued)

*Primary Examiner* — Lauren Nguyen
(74) *Attorney, Agent, or Firm* — JCIPRNET

(57) ABSTRACT

A light modulation module, including a liquid crystal on silicon (LCoS) display panel and a temperature adjustment module, is provided. The LCoS display panel is disposed on a transmission path of an illumination beam and is configured to modulate the illumination beam. The LCoS display panel is disposed in the temperature adjustment module, which includes a temperature sensing element and a temperature control element. The temperature sensing element is disposed next to the LCoS display panel and is configured to sense an ambient temperature of the LCoS display panel. The temperature control element is disposed next to the LCoS display panel and is coupled to the temperature sensing element. The temperature control element controls a temperature of the LCoS display panel according to the ambient temperature. A reflective projection device is also provided, which is applied with the light modulation module and has good reliability and good projection quality.

10 Claims, 6 Drawing Sheets

(56) References Cited

U.S. PATENT DOCUMENTS

| | | | |
|---|---|---|---|
| 2005/0179854 A1 | 8/2005 | Sekine et al. | |
| 2006/0082859 A1* | 4/2006 | Huibers | G02B 26/0833 |
| | | | 359/291 |
| 2015/0138483 A1* | 5/2015 | Lin | G02F 1/133382 |
| | | | 349/161 |

FOREIGN PATENT DOCUMENTS

| | | |
|---|---|---|
| CN | 101403847 | 4/2009 |
| CN | 101435985 | 5/2009 |
| CN | 102315180 | 1/2012 |
| CN | 104656298 | 5/2015 |
| CN | 105793744 | 7/2016 |
| CN | 110335854 | 10/2019 |
| JP | H09304834 | 11/1997 |
| JP | 2018049205 | 3/2018 |
| TW | 200422763 | 11/2004 |

OTHER PUBLICATIONS

"Office Action of China Counterpart Application", issued on Aug. 27, 2024, p. 1-p. 9.
Wu; Dazhi et al., "Semiconductor cooling device", China Electronic Components Handbook vol. 4 (Supplementary and Revised Edition of vol. 1), Oct. 31, 1992, with English translation thereof, pp. 1-4.
"Rejection Decision of China Counterpart Application", issued on Dec. 31, 2024, p. 1-p. 11.

* cited by examiner

LIGHT MODULATION MODULE HAVING TEMPERATURE ADJUSTMENT MODULE AND REFLECTIVE PROJECTION DEVICE HAVING THE SAME

CROSS-REFERENCE TO RELATED APPLICATION

This application claims the priority benefit of China application serial no. 202011055505. X, filed on Sep. 30, 2020. The entirety of the above-mentioned patent application is hereby incorporated by reference herein and made a part of this specification.

BACKGROUND

Technical Field

The disclosure relates to an optical module and a projection device, and more particularly to a light modulation module and a reflective projection device including the light modulation module.

Description of Related Art

Projection devices that use liquid crystal on silicon (LCoS) as light valves are reflective projection devices. Compared with general projection devices that use liquid crystal light valves and digital light processing (DLP) light valves, the LCoS projection devices adopt silicon substrates to manufacture related circuits. Therefore, compared with the liquid crystal projection devices and the digital projection devices, the LCoS projection devices can achieve high resolution.

However, due to the use of a liquid crystal material in the LCoS projection device, if the LCoS projection device is placed in an environment where the temperature is too high or the temperature difference is too large, the liquid crystal material may have a crystallization effect, which causes phenomenon such as poor image response, fading, or no display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a light modulation module, which has good reliability and enables a reflective projection device applied with the light modulation module to have good projection quality.

The disclosure provides a reflective projection device, which has good projection quality.

Other objectives and advantages of the disclosure may be further understood from the technical features disclosed in the disclosure.

In order to achieve one of, part of, or all of the above objectives or other objectives, an embodiment of the disclosure provides a light modulation module, which includes a liquid crystal on silicon (LCoS) display panel and a temperature adjustment module. The LCoS display panel is disposed on a transmission path of an illumination beam and is configured to modulate the illumination beam. The LCoS display panel is disposed in the temperature adjustment module. The temperature adjustment module includes a temperature sensing element and a temperature control element. The temperature sensing element is disposed next to the LCoS display panel and is configured to sense an ambient temperature of the LCoS display panel. The temperature control element is disposed next to the LCoS display panel and is coupled to the temperature sensing element. The temperature control element controls the temperature of the LCoS display panel according to the ambient temperature.

In order to achieve one of, part of, or all of the above objectives or other objectives, an embodiment of the disclosure provides a reflective projection device, which includes an illumination system, at least one abovementioned light modulation module, and a projection lens. The illumination system is configured to emit an illumination beam. The abovementioned LCoS display panel is configured to modulate the illumination beam. The projection lens is disposed on a transmission path of an image beam.

Based on the above, in the light modulation module and the reflective projection device according to the embodiments of the disclosure, the temperature adjustment module for controlling the temperature of the LCoS display panel is provided in the light modulation module. The temperature adjustment module controls the temperature of the LCoS display panel according to the ambient temperature. Therefore, the light modulation module can have good reliability, and the reflective projection device has good projection quality.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
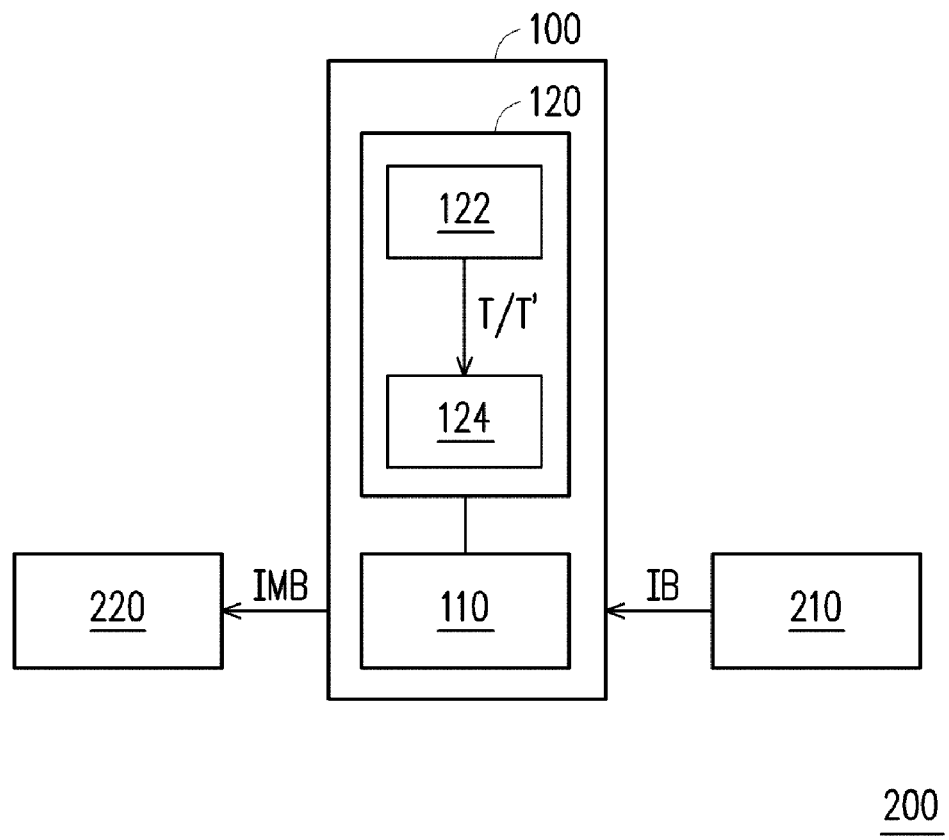
FIG. 1 is a block schematic view of a reflective projection device according to an embodiment of the disclosure.
Figure 2:
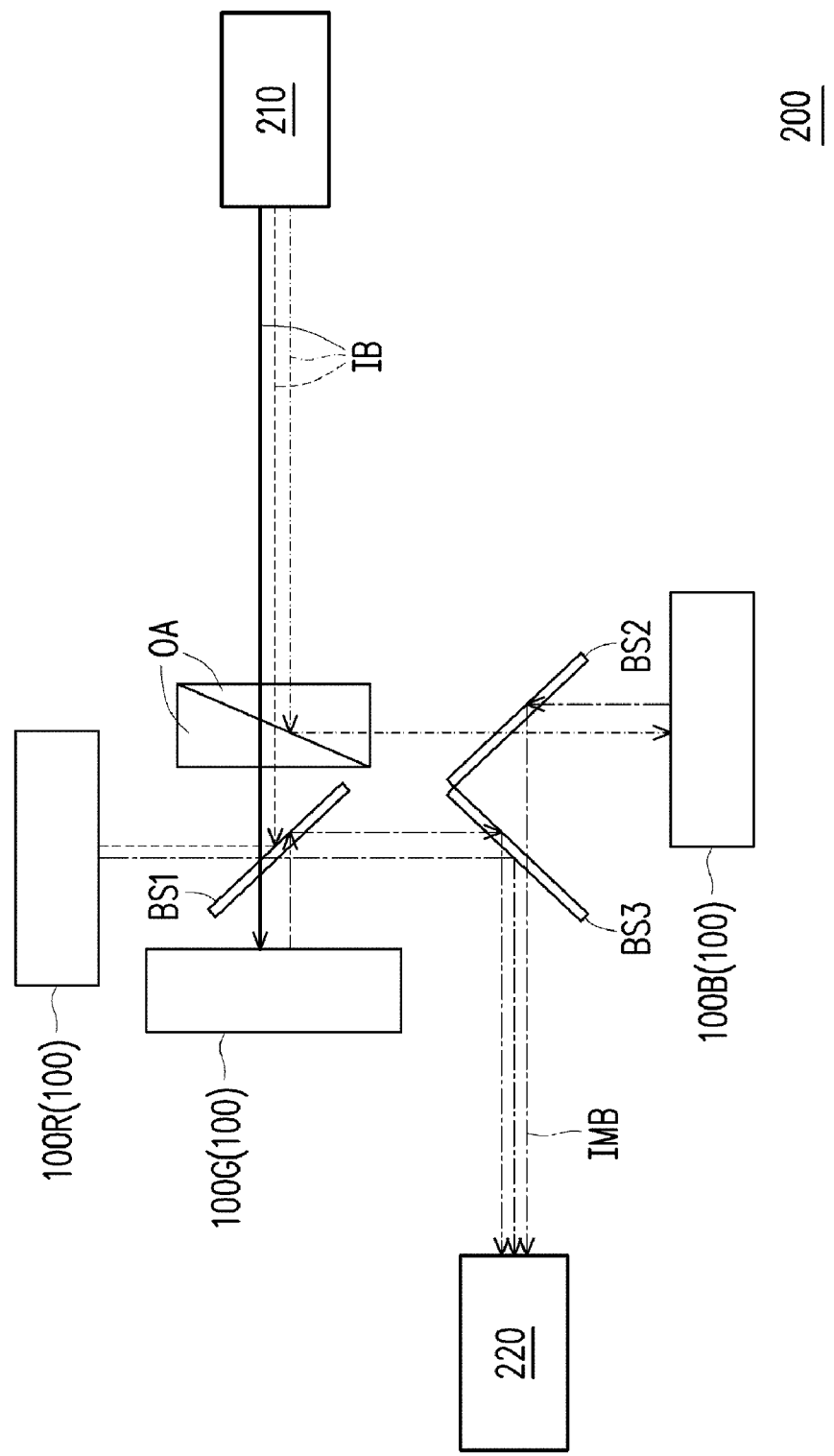
FIG. 2 is a schematic view of an optical path of the reflective projection device according to an embodiment of the disclosure.
Figure 3A:
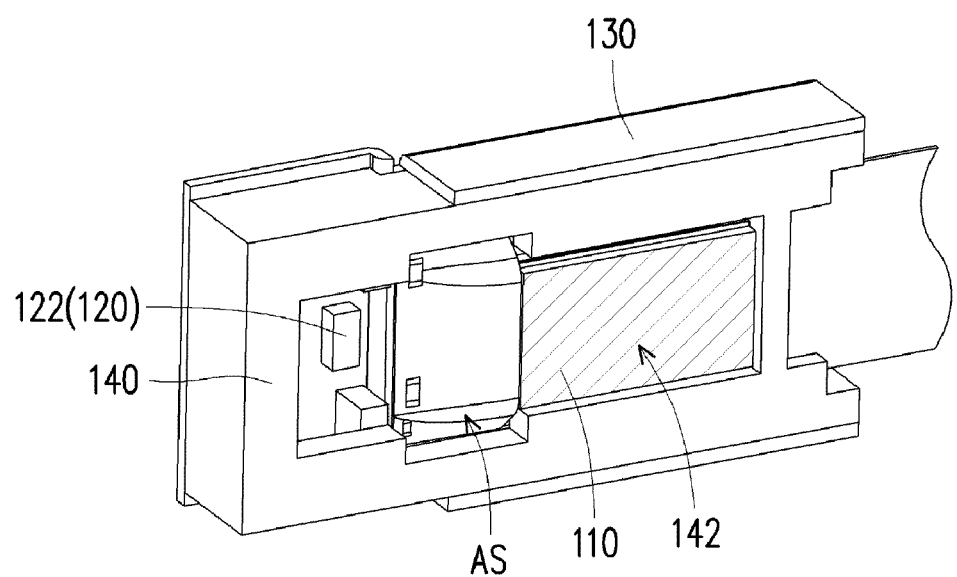
FIG. 3A is a schematic view of an appearance of a light modulation module of the embodiment in FIG. 2.
Figure 3B:
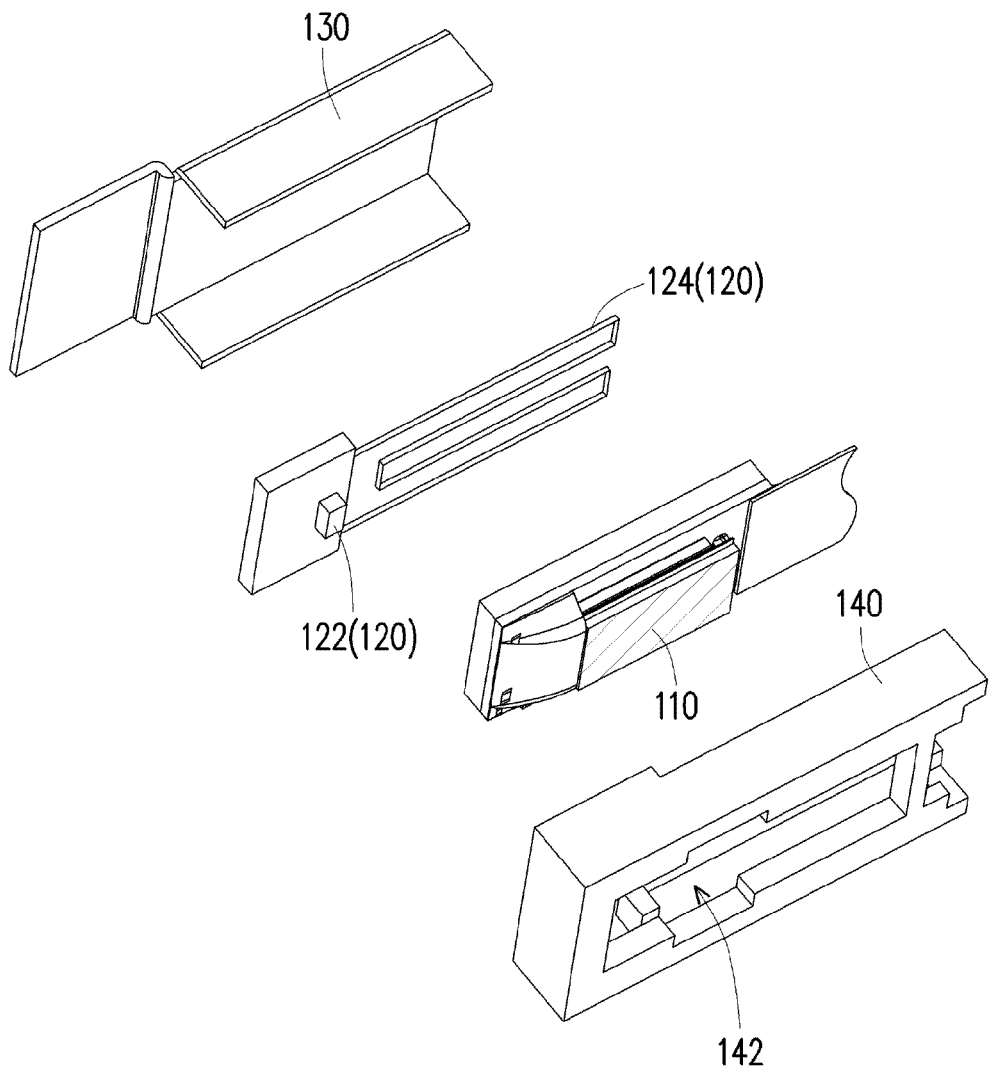
FIG. 3B is an exploded view of the light modulation module of the embodiment in FIG. 2.

FIG. 1 is a block schematic view of a reflective projection device according to an embodiment of the disclosure. FIG. 2 is a schematic view of an optical path of the reflective projection device according to an embodiment of the disclosure. FIG. 3A is a schematic view of an appearance of a light modulation module of the embodiment in FIG. 2. FIG. 3B is an exploded view of the light modulation module of the embodiment in FIG. 2.

Please refer to FIG. 1 and FIG. 2. In the embodiment, a reflective projection device 200 includes an illumination system 210, at least one light modulation module 100, and a projection lens 220. The abovementioned elements may be explained in detail in the following paragraphs. In the embodiment, the number of the light modulation modules 100 is, for example, three, which are respectively labeled as 100R, 100G, and 100B, but not limited thereto.

The illumination system 210 is configured to emit an illumination beam IB, which is, for example, an optical element assembly composed of optical elements with different optical functions, including a light-emitting element, a lens element, a reflector, etc. Persons skilled in the art may correspondingly adopt optical elements with different optical functions according to design requirements, and the disclosure is not limited thereto. In an embodiment, the illumination system 210 may also include only the light-emitting element.

Please refer to FIG. 1, FIG. 3A, and FIG. 3B. The light modulation module 100 mainly includes a liquid crystal on silicon (LCoS) display panel 110 and a temperature adjustment module 120. The temperature adjustment module 120 includes a temperature sensing element 122 and a temperature control element 124. The temperature sensing element 122 is coupled to the temperature control element 124, and the temperature control element 124 is coupled to the LCoS display panel 110. The LCoS display panel 110 is disposed on the transmission path of the illumination beam IB, and converts (or modulates) the illumination beam IB into an image beam IMB. In the embodiment, the power sources of the LCoS display panel 110 and the temperature adjustment module 120 are independent from each other. In addition, the temperature adjustment module 120 may directly support different LCoS display panels 110, especially the LCoS display panel 110 that does not have a built-in temperature control function. The temperature adjustment module 120 and the LCoS display panel 110 may be respectively disposed independently.

The temperature sensing element 122 is, for example, an electronic element that can convert temperature into an electrical signal. In some embodiments, the temperature sensing element 122 may include, for example, a thermocouple, a thermopile, a thermally sensitive resistor, an infrared sensor, etc., and the disclosure is not limited thereto. In the embodiment, the temperature sensing element 122 is, for example, separately disposed from the LCoS display panel 110, and is adjacently disposed next to the LCoS display panel 110.

The temperature control element 124 is, for example, an electronic element that can control the temperature (heating or cooling) of an object. In the embodiment, the temperature control element 124 includes a thermoelectric element, or known as a thermoelectric chip (TEC), but the disclosure is not limited thereto.

In addition, the light modulation module 100 further includes a cover 130 and a housing 140, which are, for example, sheet metal parts, and the materials thereof are, for example, metal with high thermal conductivity, and the disclosure is not limited thereto. The cover 130 and the housing 140 are also known as the outer cover for being the outermost elements of the light modulation module 100. The LCoS display panel 110 and the temperature adjustment module 120 are disposed in an accommodating space AS defined by the cover 130 and the housing 140. The cover 130 and the housing 140 are configured to protect the LCoS display panel 110 and the temperature adjustment module 120. Therefore, the cover 130 and the housing 140 may be disassembled to replace the LCoS display panel 110 or the temperature adjustment module 120.

Please refer to FIG. 3B. In detail, the temperature adjustment module 120 is located between the cover 130 and the LCoS display panel 110. The housing 140 further has an opening 142. The opening 142 exposes the temperature sensing element 122 and the LCoS display panel 110 (as shown in FIG. 3A) for the temperature sensing element 122 to sense an ambient temperature T near the LCoS display panel 110 of the light modulation module 100 and a temperature formed by the illumination beam IB received by the LCoS display panel 110.

The projection lens 220 includes, for example, a combination of one or more optical lens elements with refractive power. The optical lens element includes various combinations of non-planar lens elements such as a biconcave lens, a biconvex lens, a concave-convex lens, a convex-concave lens, a plano-convex lens, and a plano-concave lens. The disclosure does not limit the form and type of the projection lens 220. In the embodiment, the projection lens 220 is configured to project the image beam IMB onto a projection medium (for example, a projection screen or wall).

In addition, in the embodiment, the reflective projection device 200 may also optionally include an optical prism assembly OA and a plurality of light-splitting elements BS1 to BS3, which are disposed on a light transmission path between at least one light modulation module 100 and the illumination system 210, and are configured to transmit the illumination beam IB and the image beam IMB.

The effects of the reflective projection device of the embodiment may be described in detail in the following paragraphs.

Please refer to FIG. 2. In the embodiment, after the illumination system 210 emits the illumination beam IB, and after being guided by the optical prism assembly OA and the light-splitting elements BS1 to BS3, the illumination beam IB of different colors may be respectively transmitted to the light modulation modules 100R, 100G, and 100B. The LCoS display panels 110 in the light modulation modules 100R, 100G, and 100B are respectively configured to receive light beams of red light, green light, and blue light in the illumination beam IB to be respectively converted into the image beams IMB of red light, green light, and blue light. The image beams IMB of red light, green light, and blue light are reflected by the corresponding LCoS display panels 110. The image beam IMB is once again guided by the optical prism assembly OA and the light-splitting elements BS1 to BS3, and then transmitted to the projection lens 220. The projection lens 220 projects the image beam IMB onto the projection medium.

In the abovementioned projection process, the temperature sensing element 122 in the temperature adjustment module 120 is configured to sense the ambient temperature T near the LCoS display panel 110, and transmit the sensed information of the ambient temperature T to the temperature control element 124. The temperature control element 124 controls/adjusts the temperature of the LCoS display panel 110 to be set to a preset temperature interval according to the sensed ambient temperature T. The preset temperature interval is, for example, a suitable working temperature interval for the LCoS display panel 110, and the disclosure is not limited thereto. Specifically, when the temperature control element 124 receives the information of the ambient temperature T from the temperature sensing element 122, the temperature control element 124 compares the ambient temperature T with the preset temperature interval. When the ambient temperature T is higher than the temperature upper limit of the preset temperature interval, the temperature control element 124 cools the LCoS display panel 110. Conversely, when the ambient temperature T is lower than the temperature lower limit of the preset temperature interval, the temperature control element 124 heats the LCoS display panel 110. In this way, when the projector operates, a temperature T' of the LCoS display panel 110 falls within the preset temperature interval. In an embodiment, the preset temperature interval is, for example, within a temperature range of −10° C. to 60° C., but the disclosure is not limited thereto.

In addition, when the ambient temperature changes drastically, the temperature control element 124 adjusts the heating or cooling of the LCoS display panel 110, enabling the temperature T' of the LCoS display panel 110 to be maintained within the preset temperature interval, so that the working efficiency of the LCoS display panel 110 is optimized.

In view of the above, in the light modulation module 100 and the reflective projection device 200 of the embodiment, the temperature adjustment module 120 controls the temperature of the LCoS display panel 110 according to the ambient temperature T. In detail, in an embodiment, the temperature adjustment module 120 compares the ambient temperature T with the preset temperature interval. The temperature adjustment module 120 performs a heating or cooling action (or known as bidirectional temperature control) on the LCoS display panel 110 according to the comparison result to ensure that the temperature T' of the LCoS display panel 110 falls within the preset temperature interval. The abovementioned method may reduce the effect of temperature on the liquid crystal in the LCoS display panel 110. The internal liquid crystal is less likely to crystallize due to temperature. Therefore, the light modulation module 100 can have good reliability, and the reflective projection device 200 has good projection quality.

It must be noted here that the following embodiment continues to use some content of the foregoing embodiment, and the description of the same technical content is omitted. Reference may be made to some content of the foregoing embodiment for elements with the same reference numerals, which may not be repeated in the following embodiment.

Figure 4A:
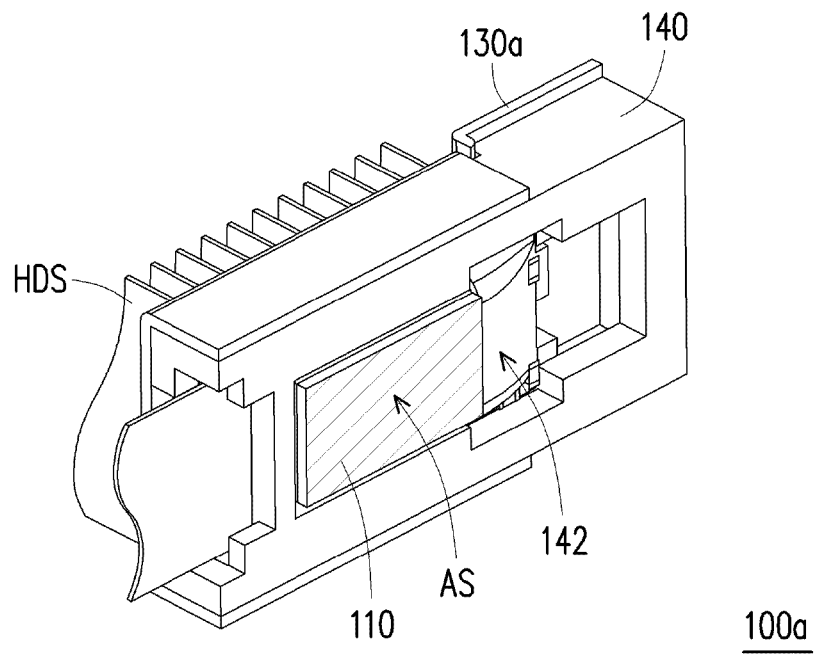
FIG. 4A and FIG. 4B are respectively schematic views of appearances of a light modulation module at different viewing angles according to another embodiment of the disclosure.
Figure 4B:
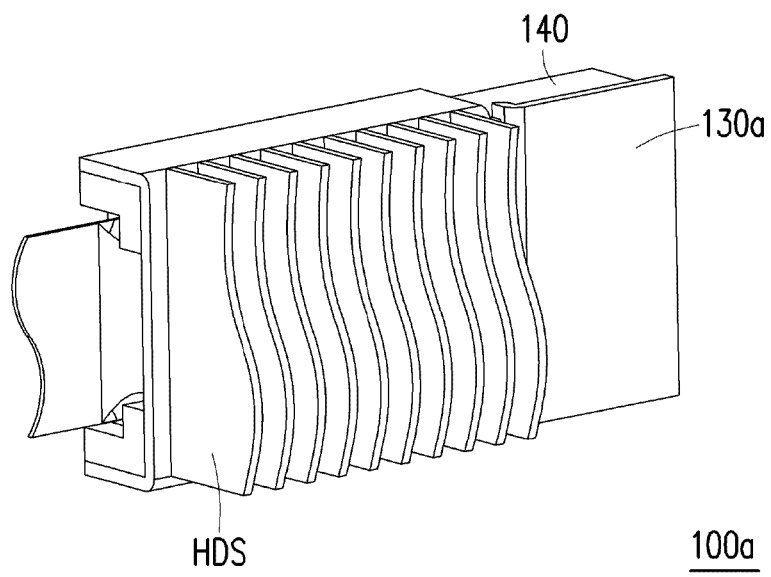
Figure 5A:
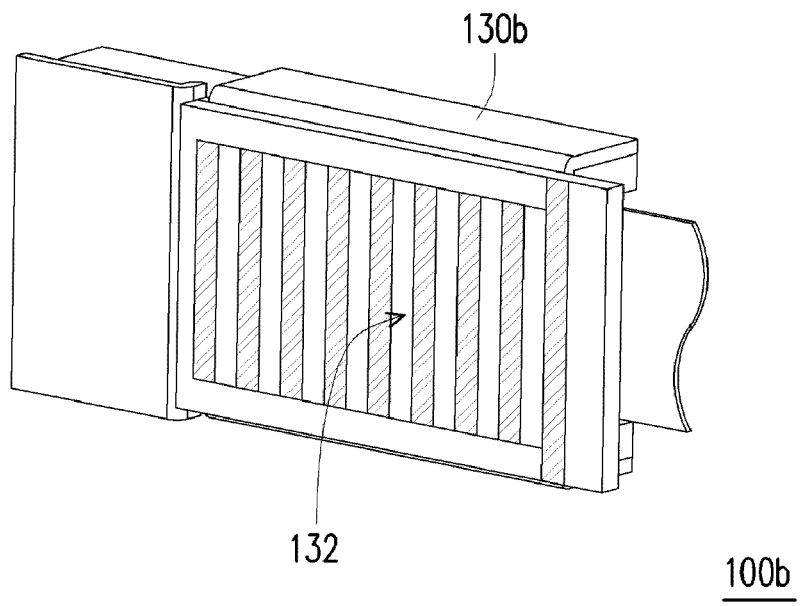
FIG. 5A and FIG. 5B are respectively schematic views of appearances of a light modulation module in different states according to yet another embodiment of the disclosure.
Figure 5B:
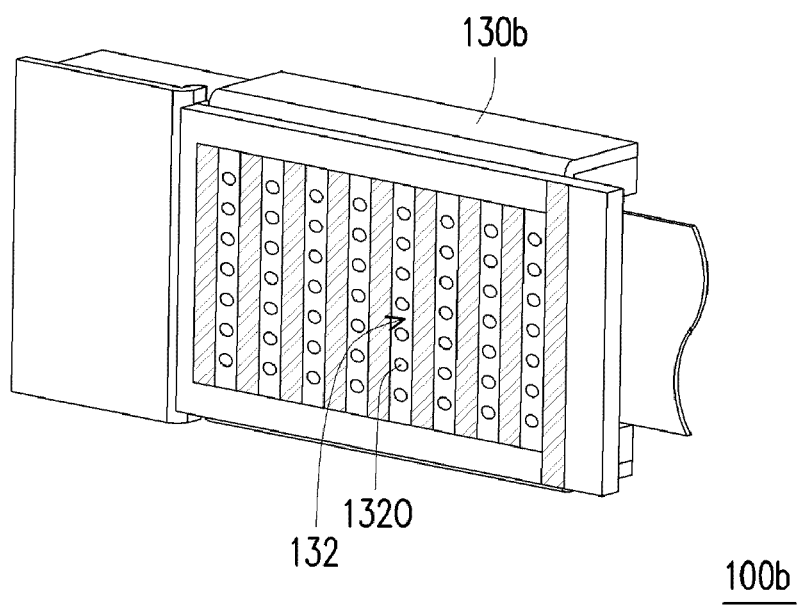

FIG. 4A and FIG. 4B are respectively schematic views of appearances of a light modulation module at different viewing angles according to another embodiment of the disclosure. FIG. 5A and FIG. 5B are respectively schematic views of appearances of a light modulation module in different states according to yet another embodiment of the disclosure.

Please refer to FIG. 4A and FIG. 4B. A light modulation module 100a of FIG. 4A and FIG. 4B is substantially similar to the light modulation module 100 of FIG. 3A and FIG. 3B, and the main difference is that: in the present embodiment, a cover 130a of the light modulation module 100a is provided with a heat-dissipation structure HDS, and the heat-dissipation structure HDS is, for example, a plurality of heat-dissipation fins, but not limited thereto. Since the heat-dissipation structure HDS increases the heat-dissipation efficiency by means of heat convection and helps in heat dissipation, the heat-dissipation structure HDS and the temperature control element 124 may coordinate cooling, which reduces the burden on the temperature control element 124.

Please refer to FIG. 5A and FIG. 5B. A light modulation module 100b of FIG. 5A and FIG. 5B is substantially similar to the light modulation module 100 of FIG. 3A and FIG. 3B, and the main difference is that: in the present embodiment, a cover 130b of the light modulation module 100b further includes a solenoid valve module 132. The solenoid valve module 132 further has a plurality of convection openings 132O. The solenoid valve module 132 is coupled (electrically connected) to the temperature control element 124. The temperature control element 124 controls the solenoid valve module 132 to turn on or turn off the convection openings 132O, so as to control or adjust the temperature T' of the LCoS display panel 110. Specifically, when the temperature control element 124 decides to raise the temperature of the LCoS display panel 110 according to the abovementioned judgment method, the temperature control element 124 may heat the LCoS display panel 110 on the one hand, and control the convection openings 132O of the solenoid valve module 132 to be turned off on the other hand, which prevents heat dissipation, as shown in FIG. 5A. Conversely, when the temperature control element 124 decides to cool the LCoS display panel 110 according to the abovementioned judgment method, the temperature control element 124 may perform a cooling action on the LCoS display panel 110 on the one hand, and control the convection openings 132O of the solenoid valve module 132 to be turned on on the other hand, which facilitates heat convection and cooling, as shown in FIG. 5B.

In the above embodiment, the light modulation modules 100a and 100b are respectively provided with the heat-dissipation structure HDS and the solenoid valve module 132. In other unshown embodiments, the light modulation module may also be provided with a heat-dissipation structure and a solenoid valve module at the same time to coordinate heat dissipation, and the disclosure is not limited thereto.

In an unshown embodiment, the heat source (such as a light source) in the illumination system may be connected to the outer cover of the light modulation module. Since the material of the outer cover is metal with high thermal conductivity, when the temperature control element judges that the LCoS display panel needs to be heated, the temperature control element and the heat source in the illumination system may coordinate heating of the LCoS display panel, which may reduce the burden of the temperature control element. Alternatively, the user or other external heat sources relative to the light modulation module may also conduct heat to the LCoS display panel using the outer cover to coordinate heating. In other embodiments, in addition to the thermoelectric chip, the temperature control element may also include a heating element (for example, a thermal resistor). The thermoelectric chip may be responsible for the cooling and heating processes, and the heating element may be responsible for the heating process, but the disclosure is not limited thereto.

In summary, in the light modulation module and the reflective projection device according to the embodiments of the disclosure, the temperature adjustment module for controlling the temperature of the LCoS display panel is provided in the light modulation module. The temperature adjustment module controls or adjusts the temperature of the LCoS display panel according to the ambient temperature near the LCoS display panel. Therefore, the light modulation module can have good reliability, and the reflective projection device has good projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A light modulation module, comprising a liquid crystal on silicon (LCoS) display panel and a temperature adjustment module, wherein:
   the LCOS display panel is disposed on a transmission path of an illumination beam, and the LCOS display panel is configured to modulate the illumination beam into an image beam and reflect the image beam; and
   the temperature adjustment module comprises a temperature sensing element and a temperature control element, and the temperature control element is coupled to the LCOS display panel, wherein:
   the temperature sensing element and the LCOS display panel are separately disposed;
   the temperature sensing element is disposed adjacent to the LCOS display panel and is configured to sense an ambient temperature near the LCOS display panel, and a power source of the LCOS display panel is different from a power source of the temperature adjustment module;
   the temperature control element is disposed next to the LCOS display panel and is coupled to the temperature sensing element, and a temperature of the LCOS display panel is controlled to fall within a preset temperature interval by the temperature control element according to the sensed ambient temperature, and the temperature adjustment module is configured to compare the sensed ambient temperature with the preset temperature interval to generate a comparison result, wherein
   the temperature control element is configured to cool the LCOS display panel until the temperature of the LCOS display panel falls within the preset temperature interval in response to the comparison result being that the sensed ambient temperature is higher than a temperature upper limit of the preset temperature interval;
   the temperature control element is configured to heats the LCOS display panel until the temperature of the LCOS display panel falls within the preset temperature interval in response to the comparison result being that the sensed ambient temperature is lower than a temperature lower limit of the preset temperature interval; and
   the temperature control element is configured not to cool or heat the LCOS display panel in response to the comparison result being that the sensed ambient temperature falls within the preset temperature interval.

2. The light modulation module according to claim 1, wherein the temperature control element comprises a thermoelectric element, wherein the thermoelectric element is configured to raise or lower the temperature of the LCOS display panel.

3. The light modulation module according to claim 1, wherein the light modulation module further comprises:
a cover, having a solenoid valve module, wherein the solenoid valve module has a plurality of convection openings and is coupled to the temperature control element, wherein
the temperature sensing element is configured to control the plurality of convection openings of the solenoid valve module, so that the plurality of convection openings are turned on or turned off to control the temperature of the LCOS display panel.

4. The light modulation module according to claim 1, wherein the light modulation module further comprises:
a cover, having a heat-dissipation structure, wherein the LCOS display panel is located between the cover and a housing.

5. The light modulation module according to claim 4, wherein the heat-dissipation structure is a heat-dissipation fin.

6. A reflective projection device, comprising an illumination system, at least one light modulation module, and a projection lens, wherein:
the illumination system is configured to emit an illumination beam;
each of the at least one light modulation module comprises a LCoS display panel and a temperature adjustment module, wherein:
the LCOS display panel is disposed on a transmission path of the illumination beam and the LCOS display panel is configured to convert the illumination beam into an image beam and reflect the image beam; and
the temperature adjustment module comprises a temperature sensing element and a temperature control element, and the temperature control element is coupled to the LCOS display panel, and a power source of the LCOS display panel is different from a power source of the temperature adjustment module, wherein:
the temperature sensing element and the LCOS display panel are separately disposed;
the temperature sensing element is disposed adjacent to the LCOS display panel and is configured to sense an ambient temperature near the LCOS display panel;
the temperature control element is disposed next to the LCOS display panel and is coupled to the temperature sensing element, and a temperature of the LCoS display panel is controlled to fall within a preset temperature interval by the temperature control element according to the sensed ambient temperature, and the temperature adjustment module is configured to compare the sensed ambient temperature with the preset temperature interval to generate a comparison result, wherein
the temperature control element is configured to cool the LCOS display panel until the temperature of the LCOS display panel falls within the preset temperature interval in response to the comparison result being that the sensed ambient temperature is higher than a temperature upper limit of the preset temperature interval;
the temperature control element is configured to heats the LCOS display panel until the temperature of the LCOS display panel falls within the preset temperature interval in response to the comparison result being that the sensed ambient temperature is lower than a temperature lower limit of the preset temperature interval; and
the temperature control element is configured not to cool or heat the LCOS display panel in response to the comparison result being that the sensed ambient temperature falls within the preset temperature interval; and
the projection lens is disposed on a transmission path of the image beam.

7. The reflective projection device according to claim 6, wherein the temperature control element comprises a thermoelectric element, wherein the thermoelectric element is configured to raise or lower the temperature of the LCOS display panel.

8. The reflective projection device according to claim 6, wherein the light modulation module further comprises:
a cover, having a solenoid valve module, wherein the solenoid valve module has a plurality of convection openings and is coupled to the temperature control element, wherein
the temperature sensing element is configured to control the plurality of convection openings of the solenoid valve module, so that the plurality of convection openings are turned on or turned off to control the temperature of the LCOS display panel.

9. The reflective projection device according to claim 6, wherein the light modulation module further comprises:
a cover, having a heat-dissipation structure, wherein the LCOS display panel is located between the cover and a housing.

10. The reflective projection device according to claim 9, wherein the heat-dissipation structure is a heat-dissipation fin.

* * * * *